US008818703B2

(12) United States Patent
Harada

(10) Patent No.: US 8,818,703 B2
(45) Date of Patent: Aug. 26, 2014

(54) OBJECT RECOGNITION DEVICE AND OBJECT RECOGNITION METHOD

(75) Inventor: Tomoaki Harada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 280 days.

(21) Appl. No.: 13/143,615

(22) PCT Filed: Jan. 29, 2009

(86) PCT No.: PCT/JP2009/000346
§ 371 (c)(1),
(2), (4) Date: Jul. 7, 2011

(87) PCT Pub. No.: WO2010/086895
PCT Pub. Date: Aug. 5, 2010

(65) Prior Publication Data
US 2011/0301845 A1 Dec. 8, 2011

(51) Int. Cl.
*G06F 17/10* (2006.01)
*B60R 22/00* (2006.01)
*G06F 19/00* (2011.01)
*G05D 1/00* (2006.01)
*G01S 13/00* (2006.01)
*G01S 7/40* (2006.01)

(52) U.S. Cl.
USPC ............. 701/301; 701/45; 701/117; 701/1; 342/70; 342/72; 342/173; 342/59

(58) Field of Classification Search
CPC .... B60R 21/0134; B60W 30/095; G08G 1/16
USPC ........... 701/301, 45, 117, 1, 207; 342/70, 72, 342/173, 59; 340/345, 903, 436, 901; 348/148
See application file for complete search history.

(56) References Cited

U.S. PATENT DOCUMENTS 5,249,157 A * 9/1993 Taylor ........................... 340/903
5,572,428 A * 11/1996 Ishida et al. .................. 701/301

(Continued)

FOREIGN PATENT DOCUMENTS

DE 19724496 12/1997
JP 7 104062 4/1995

(Continued)

OTHER PUBLICATIONS

International Search Report Issued May 19, 2009 in PCT/JP09/000346 filed Jan. 29, 2009.

*Primary Examiner* — Calvin Cheung
*Assistant Examiner* — Basil T Jos
(74) *Attorney, Agent, or Firm* — Oblon, Spivak, McClelland, Maier & Neustadt, L.L.P.

(57) ABSTRACT

Provided is an object recognition device and an object recognition method that can estimate the size of an object detected by a radar, through a simple configuration. The object recognition device includes: a detection section for radiating an electromagnetic wave to an object in a forward direction of the vehicle and for detecting the object by receiving a reflected wave reflected by the object; a target information calculation section for calculating information containing a moving direction of the detected object as target information, by using a signal received by the detection section; a vehicle information calculation section for calculating information containing a moving direction of the vehicle as vehicle information, by using information obtained from the vehicle; and a processing section for estimating, based on the information indicating the moving direction of the object contained in the target information and the information indicating the moving direction of the vehicle contained in the vehicle information, from which portion of the object detected by the detection section the electromagnetic wave was reflected, and for calculating a presence area in which the object is present relative to the vehicle, in accordance with a result of the estimation.

9 Claims, 12 Drawing Sheets

(56) References Cited

U.S. PATENT DOCUMENTS

| | | | |
|---|---|---|---|
| 5,734,344 A * | 3/1998 | Yamada | 342/72 |
| 5,936,549 A * | 8/1999 | Tsuchiya | 340/903 |
| 6,018,308 A * | 1/2000 | Shirai | 342/70 |
| 6,114,951 A * | 9/2000 | Kinoshita et al. | 340/436 |
| 6,487,500 B2 | 11/2002 | Lemelson et al. | 701/301 |
| 6,643,588 B1 * | 11/2003 | Ibrahim | 701/301 |
| 6,683,560 B2 * | 1/2004 | Bauhahn | 342/173 |
| 6,992,613 B2 * | 1/2006 | Yoneda | 342/59 |
| 7,409,295 B2 * | 8/2008 | Paradie | 701/301 |
| 7,522,092 B2 * | 4/2009 | Okai et al. | 342/70 |
| 7,545,261 B1 * | 6/2009 | Harrington | 340/435 |
| 7,554,484 B2 * | 6/2009 | Zimmermann et al. | 342/70 |
| 7,592,945 B2 * | 9/2009 | Colburn et al. | 342/70 |
| 7,688,188 B2 * | 3/2010 | Kume et al. | 340/436 |
| 7,777,618 B2 * | 8/2010 | Schiffmann et al. | 340/436 |
| 8,154,422 B2 * | 4/2012 | Hsu et al. | 340/903 |
| 2003/0016143 A1 * | 1/2003 | Ghazarian | 340/901 |
| 2003/0218564 A1 * | 11/2003 | Tamatsu et al. | 342/70 |
| 2004/0019420 A1 * | 1/2004 | Rao et al. | 701/45 |
| 2005/0270225 A1 * | 12/2005 | Tokoro | 342/70 |
| 2006/0158369 A1 * | 7/2006 | Shinoda et al. | 342/70 |
| 2006/0274149 A1 * | 12/2006 | Yoshizawa | 348/148 |
| 2007/0021915 A1 * | 1/2007 | Breed et al. | 701/301 |
| 2007/0043502 A1 * | 2/2007 | Mudalige et al. | 701/207 |
| 2007/0115169 A1 * | 5/2007 | Kai et al. | 342/174 |
| 2007/0152804 A1 * | 7/2007 | Breed et al. | 340/435 |
| 2007/0192006 A1 * | 8/2007 | Kimura et al. | 701/45 |
| 2007/0222566 A1 * | 9/2007 | Tsuji et al. | 340/435 |
| 2008/0018523 A1 * | 1/2008 | Kelly et al. | 342/70 |
| 2008/0169966 A1 * | 7/2008 | Tsuchihashi et al. | 342/70 |
| 2008/0215231 A1 * | 9/2008 | Breed | 701/117 |
| 2009/0018711 A1 * | 1/2009 | Ueda et al. | 701/1 |
| 2009/0228157 A1 * | 9/2009 | Breed | 701/1 |

FOREIGN PATENT DOCUMENTS

| | | |
|---|---|---|
| JP | 2002 341020 | 11/2002 |
| JP | 2003-232853 | 8/2003 |
| JP | 2003 232853 | 8/2003 |
| JP | 2004 347489 | 12/2004 |
| JP | 2007 279892 | 10/2007 |
| JP | 2008 267826 | 11/2008 |
| JP | 2008-267826 | 11/2008 |

* cited by examiner

F I G. 6
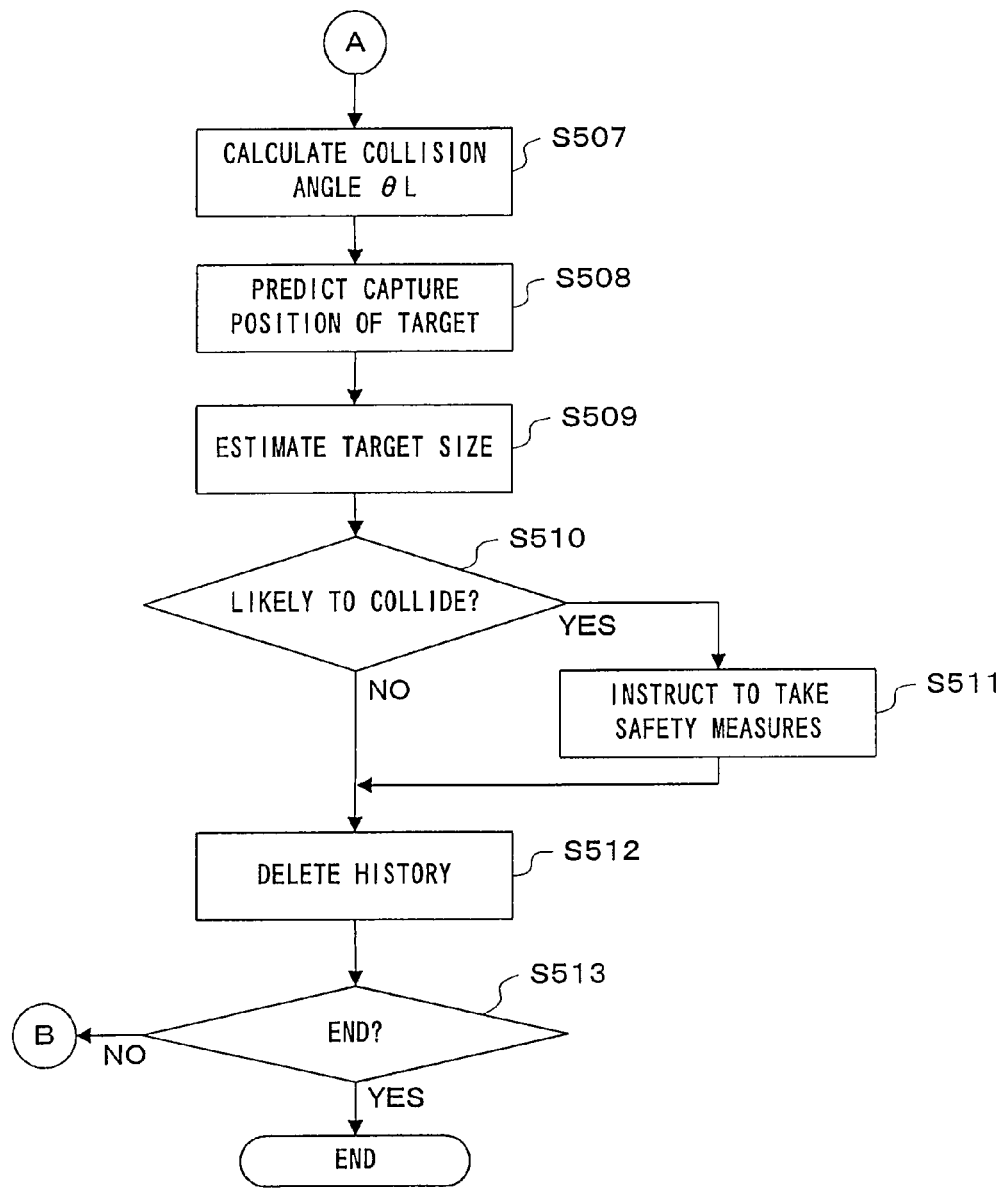

F I G. 7
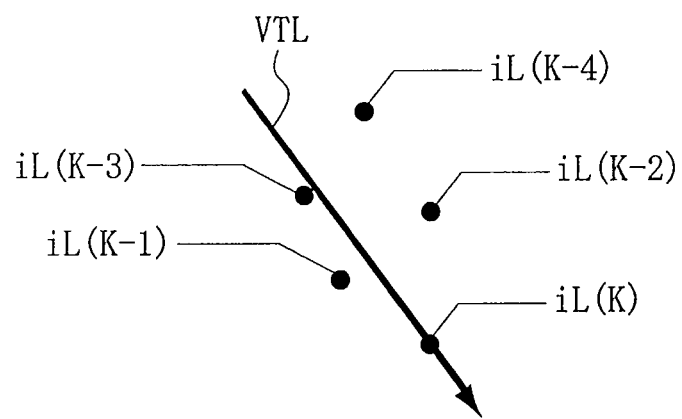

OBJECT RECOGNITION DEVICE AND OBJECT RECOGNITION METHOD

TECHNICAL FIELD

The present invention relates to an object recognition device mounted in a vehicle such as an automobile and for predicting a collision between the vehicle and an object, and an object recognition method. The present invention relates, in particular, to an object recognition device and an object recognition method for predicting a risk of an object approaching the vehicle colliding with the vehicle.

BACKGROUND ART

Recently, object recognition devices have become practical that detect another vehicle approaching an own-vehicle from a side of the own-vehicle, by means of millimeter wave radars installed in the own-vehicle, and that determine whether there is a risk of collision between the own-vehicle and the other vehicle.

Meanwhile, such existing mass-produced object recognition devices determine, when they detect a target-object by means of millimeter wave radars mounted on the own-vehicle, a risk of collision based on positional coordinate information which regards the target-object as a point. Therefore, the object recognition devices cannot determine the size of the target-object.

That is, in a case where a radar has detected an object, an object recognition device determines a possibility of collision based on the position coordinates of a point, on the object, that the radar has captured (captured point). Accordingly, even when there is a risk of collision between the object and the own-vehicle, it may be determined that the risk of collision between the own-vehicle and the object is low, depending on the position of the captured point on the detected object. A more specific description will be given below with reference to FIG. 14.

FIG. 14 shows a case where another vehicle VO is approaching an own-vehicle VM from the forward-left direction. With reference to FIG. 14, it is assumed that, for example, in a case where the own-vehicle VM is at an A1 point, a radar installed in the own-vehicle VM has detected a right front edge of the other vehicle VO which is at a B1 point (a tip of the other vehicle VO nearest to the own-vehicle VM), as a captured point P. Then, when the own-vehicle VM advances to an A2 point and the other vehicle VO advances to a B2 point, if the positional relationship between the captured point P and the own-vehicle VM alone is taken into consideration, it is considered that the own-vehicle VM does not collide with the other vehicle VO and they can pass by each other. However, if the size (length) of the other vehicle VO is taken into consideration, it is highly possible for the own-vehicle VM to collide with the other vehicle VO actually, as shown in FIG. 14. That is, a general object recognition device regards the target as a point and does not take the size of the target into consideration, and thus the case shown in FIG. 14 may occur.

A technology for solving such a problem is, for example, a device disclosed in Patent Literature 1. The device disclosed in Patent Literature 1 searches, when a radar has detected a target-object, an area around the detected point by means of a camera, and detects an edge of the target-object.

[Patent Literature 1] Japanese Patent Laid-open Publication No. 2007-279892

DISCLOSURE OF THE INVENTION

Problems to be Solved by the Invention

However, the device disclosed in Patent Literature 1 has a problem in that the device needs to perform image processing for extracting edge points from an image taken by the camera, in addition to calculation processing of, for example, the relative position and relative speed and the like of the target-object with respect to the own-vehicle, based on the information acquired by the radar, which results in complicated processing. Further, in the case of the device disclosed in Patent Literature 1, it is necessary to install the camera in the own-vehicle, in addition to the radar for detecting the target-object, which causes a disadvantage in terms of costs. Moreover, installation of the camera in addition to the radar to the own-vehicle may affect the design of the own-vehicle, and therefore, it may be desired that such a camera is not installed.

The present invention is made to solve the problems as described above. An object of the present invention is to provide an object recognition device and an object recognition method that have a simple configuration and are capable of estimating the size of an object detected by a radar.

Solution to the Problems

In order to attain the above object, the present invention has employed the following configuration. That is, a first aspect is directed to an object recognition device to be mounted on a vehicle, the device including: a detection section for radiating an electromagnetic wave to an object in a forward direction of the vehicle and for detecting the object by receiving a reflected wave reflected by the object; a target information calculation section for calculating information containing a moving direction of the detected object as target information, by using a signal received by the detection section; a vehicle information calculation section for calculating information containing one of a current moving direction or a future prediction moving direction of the vehicle as vehicle information, by using information obtained from the vehicle; and a processing section for calculating, as a collision angle, an angle between a straight line extended in the moving direction of the object and a straight line extended in the current moving direction or in the future prediction moving direction of the vehicle, estimating, based on the collision angle from which one of front edge portions in the moving direction of the object detected by the detection section the electromagnetic wave was reflected, and for calculating a presence area in which the object is present relative to the vehicle, in accordance with a result of the estimation, in which in a case where the collision angle is a right angle or a substantially right angle, the processing section estimates that the electromagnetic wave was reflected from the one of the front edge portions that is on a side facing the vehicle, and in a case where the collision angle is not a right angle or a substantially right angle, the processing section estimates that the electromagnetic wave was reflected from one of the front edge portions of the object that is nearest to a straight line extended in the current moving direction or in the future prediction moving direction of the vehicle.

In a second aspect based on the first aspect, the object recognition device further includes a collision determination section for regarding the object detected by the detection section as being present in the presence area calculated by the processing section, and for determining a risk of collision between the vehicle and the object.

In a third aspect based on the first or the second aspect, the one of front edge portions is one of front corner edge portions, in the moving direction, of the object.

In a fourth aspect based on the third aspect, the processing section regards the object detected by the detection section as another vehicle, and calculates, as the presence area, an area assuming a shape of the other vehicle, based on the position of the one of the front edge portions from which the electromagnetic wave was reflected.

A fifth aspect is directed to An object recognition method using an object recognition device to be mounted on a vehicle, the method including: a detection step of radiating an electromagnetic wave to an object in a forward direction of the vehicle and for detecting the object by receiving a reflected wave reflected by the object; a target information calculation step of calculating information containing a moving direction of the detected object as target information, by using a signal received in the detection step; a vehicle information calculation step of calculating information containing one of a current moving direction or a future prediction moving direction of the vehicle as vehicle information, by using information obtained from the vehicle; and a processing step of calculating, as a collision angle, an angle between a straight line extended in the moving direction of the object and a straight line extended in the current moving direction or in the future prediction moving direction of the vehicle, estimating, based on the collision angle from which one of front edge portions in the moving direction of the object detected in the detection step the electromagnetic wave was reflected, and for calculating a presence area in which the object is present relative to the vehicle, in accordance with a result of the estimation, in which in a case where the collision angle is a right angle or a substantially right angle, the processing step estimates that the electromagnetic wave was reflected from the one of the front edge portions that is on a side facing the vehicle, and in a case where the collision angle is not a right angle or a substantially right angle, the processing step estimates that the electromagnetic wave was reflected from one of the front edge portions of the object that is nearest to a straight line extended in the current moving direction or in the future prediction moving direction of the vehicle.

Advantageous Effects of the Invention

According to the first aspect, it is possible to calculate, based on the moving direction of the object detected by the detection section and the moving direction of the vehicle, the size of the object, that is, a presence area in which the object is present relative to the vehicle. Therefore, for example, without mounting a camera or the like on the vehicle, it is possible to estimate the size of the object detected by the detection section, through a simple configuration. Further, the direction in which the object is advancing toward the vehicle is predicted based on the collision angle, and from which one of the front edge portions the electromagnetic wave was reflected was estimated. Therefore, the size of the target can be taken into consideration. That is, the object detected by the detection section is not regarded as a point, but can be regarded as an object having a given orientation and size. Therefore, the possibility of collision can be determined more accurately.

According to the second aspect, the possibility of collision between the object and the vehicle is determined, in consideration of the size of the object as well. Therefore, the accuracy of the determination of the possibility of collision is improved compared with a case where the possibility of collision is determined with the detected object regarded as a point, as in a conventional device.

According to the third aspect, the tip of the object advancing toward the vehicle can be detected.

According to the fourth aspect, the object detected by the detection section is regarded as another vehicle in advance. Therefore, the object recognition device can be used more favorably in an environment where the vehicle on which the object recognition device is mounted is actually used, that is, in a general travelling environment.

According to the object recognition method of the present invention, it is possible to obtain the same effect as in the object recognition device of the present invention described above.

BRIEF DESCRIPTION OF THE DRAWINGS

FIG. 6 is a flow chart showing a second half of the example of the processes performed at the sections in the system ECU 3 of the object recognition device of the present embodiment.

FIG. 7 shows a target detection state stored in a target information storage section 34.

DESCRIPTION OF THE REFERENCE CHARACTERS

Figure 1:
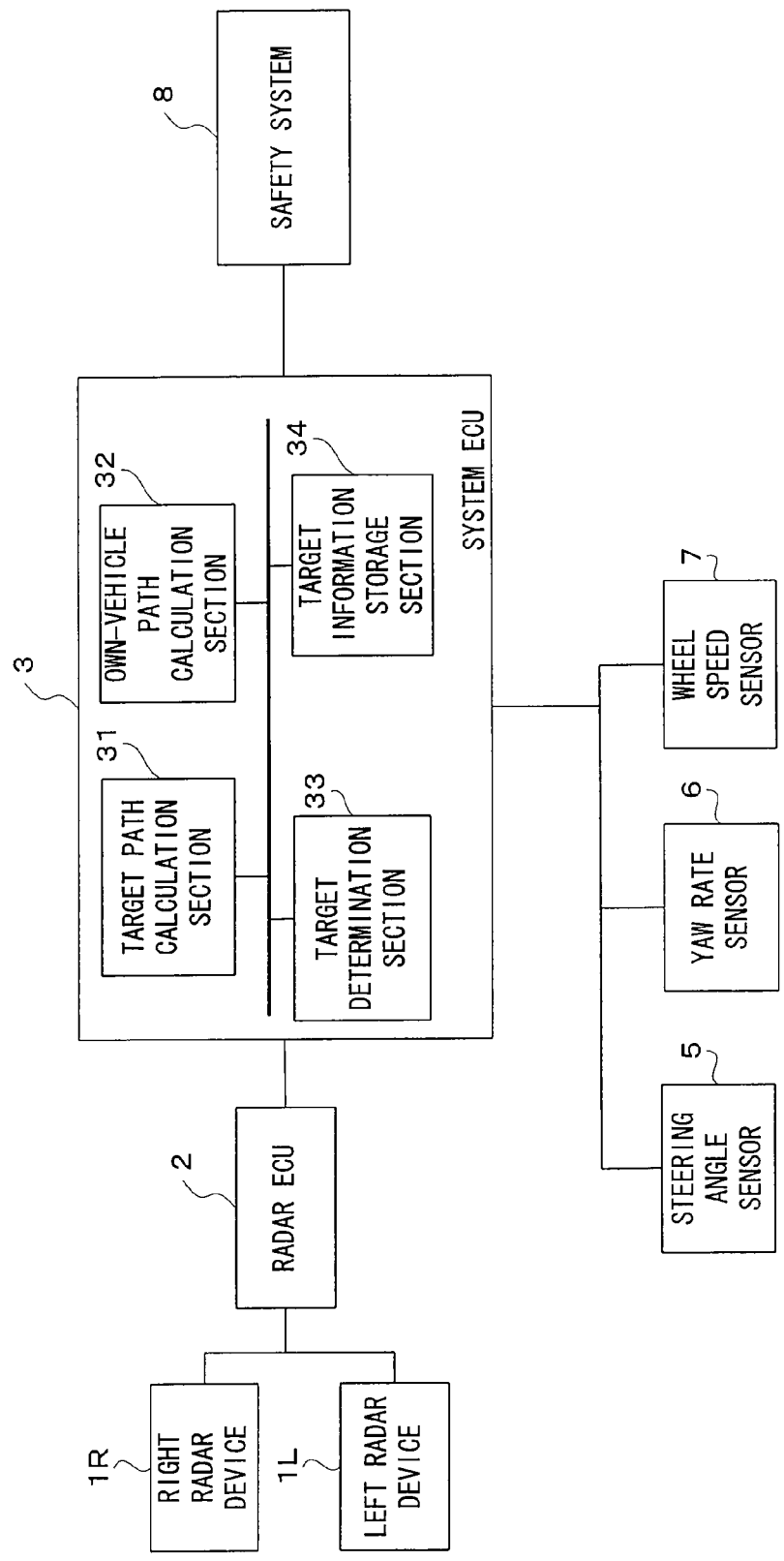
FIG. 1 is a block diagram showing an example of a configuration of a driving support system including an object recognition device.

1R . . . right radar
1L . . . left radar
2 . . . radar ECU
3 . . . system ECU
31 . . . target path calculation section
32 . . . own-vehicle path calculation section
33 . . . target determination section
34 . . . target information storage section
5 . . . steering angle sensor
6 . . . yaw rate sensor
7 . . . wheel speed sensor
8 . . . safety system

BEST MODE FOR CARRYING OUT THE INVENTION

Hereinafter, with reference to the drawings, an object recognition device according to an embodiment of the present invention will be described. It should be noted that in the present embodiment, description will be given on an assumption that a driving support system including the object recognition device is installed in a vehicle (hereinafter referred to as own-vehicle VM). FIG. 1 is a block diagram showing an example of a configuration of a driving support system including the object recognition device.

As shown in FIG. 1, the driving support system according to the present embodiment includes a right radar device 1R, a left radar device 1L, a radar ECU (Electronic Control Unit) 2, a system ECU (Electronic Control Unit) 3, and a safety system 8.

A steering angle sensor 5, a yaw rate sensor 6, and a wheel speed sensor 7 for each acquiring vehicle information of an own-vehicle are connected to the system ECU 3.

Figure 2:
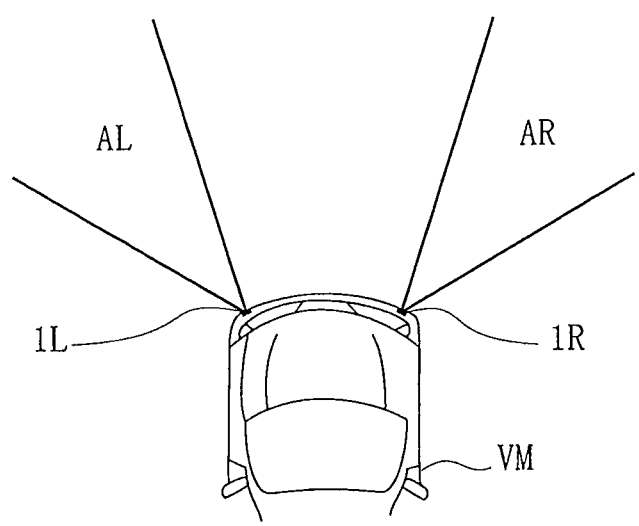
FIG. 2 shows an example of radar devices 1 mounted in an own-vehicle VM.

The right radar device 1R is installed at a predetermined position of the own-vehicle VM (for example, a position, in a front part of the own-vehicle VM, at which a right head lamp or a right direction indicator is mounted), radiates electromagnetic waves toward the outside of the own-vehicle VM, and monitors the forward direction of the own-vehicle VM. As shown in FIG. 2, the right radar device 1R radiates electromagnetic waves in a diagonally forward right direction of the own-vehicle VM, and detects a target (for example, another vehicle, bicycle, pedestrian, building, and the like) present in the detection range of the right radar device 1R (AR in FIG. 2).

The left radar device 1L is installed at a predetermined position of the own-vehicle VM (for example, a position, in a front part of the own-vehicle VM, at which a left head lamp or a left direction indicator is mounted), radiates electromagnetic waves toward the outside of the own-vehicle VM, and monitors the forward direction of the own-vehicle VM. As shown in FIG. 2, for example, the left radar device 1L radiates electromagnetic waves toward a diagonally forward left direction of the own-vehicle VM, and detects a target (for example, another vehicle, bicycle, pedestrian, building, and the like) present in the detection range of the left radar device 1L (AL in FIG. 2).

Specifically, each of the right radar device 1R and the left radar device 1L radiates an electromagnetic wave and receives the reflected wave. Then, each of the right radar device 1R and the left radar device 1L detects, for example, a target present in a forward direction of the own-vehicle VM, and outputs to the radar ECU 2 a signal indicating that the target has been detected. Moreover, each radar device outputs a signal for each target that has been detected. In a case where each radar device detects a plurality of targets, each radar device outputs, for each target, a signal indicating that the target has been detected, to the radar ECU 2.

It should be noted that each radar device has an identical configuration except that the direction in which electromagnetic waves are radiated is different. Therefore, in the description below, each of the radar devices is referred to as merely a "radar device 1" except when the right radar device 1R and the left radar device 1L are specifically distinguished. The radar device 1 corresponds to an example of a detection section defined in claims.

With reference back to FIG. 1, the radar ECU 2 calculates, for each radar device 1, target information, such as the position, speed, distance of a target relative to the own-vehicle VM by using signals acquired from the radar device 1. For example, the radar ECU 2 calculates, for each radar device 1, the relative distance, relative speed, relative position, and the like of a target with respect to the radar device 1, by using the sum of and the difference between a radiation wave radiated by the radar device 1 and the reflected wave received by the radar device 1, transmission/reception timings, and the like. Then, the radar ECU 2 generates, as target information ir, information containing the distance, speed, position, and the like of the target relative to the right radar device 1R, and generates, as target information il, information containing the distance, speed, position, and the like of a target relative to the left radar device 1L.

Further, the radar ECU 2 uses the target information ir or the target information il and performs a process of converting the position of the detected target into coordinates in a coordinate system having its origin at a predetermined position of the front part of the own-vehicle VM, which will be described in detail below. Generally, position information of a target contained in the target information ir to be outputted from the right radar device 1R is outputted, expressed in a coordinate system having its origin at a position at which the right radar device 1R is installed (this is similarly applied to the left radar device 1L). Therefore, in order to make a below-described processes performed by the system ECU 3 simple, the radar ECU 2 performs a process of converting the position of a target represented by the position information contained in each of the target information ir and the target information il, into a position in a corresponding coordinate system having its origin at a predetermined position of the front part of the own-vehicle VM. Then, the radar ECU 2 outputs, to the system ECU 3, target information obtained through the coordinate conversion process. It should be noted that, in the description below, the target information ir and the target information il after being subjected to the coordinate conversion process are referred to as target information iR and target information iL, respectively.

Next, the system ECU 3 shown in FIG. 1 will be described. As shown in FIG. 1, the system ECU 3 includes a target path calculation section 31, an own-vehicle path calculation section 32, a target determination section 33, and a target information storage section 34.

The steering angle sensor 5, the yaw rate sensor 6, and the wheel speed sensor 7 are connected to the system ECU 3. The steering angle sensor 5 detects a steering angle based on rotation information of steering wheels of the own-vehicle VM. The yaw rate sensor 6 detects a yaw rate, which is an angular speed of a rotation toward a turning direction of a cornering own-vehicle VM seen from above (rotational angular speed). The wheel speed sensor 7 detects a wheel rotation speed.

The target path calculation section 31 predicts, based on the target information iR and the target information iL outputted from the radar ECU 2, a travelling direction of the target (predicts a path along which the target will advance toward the own-vehicle VM). The target path calculation section 31 corresponds to an example of a target calculation section defined in claims.

The own-vehicle path calculation section 32 predicts, based on information outputted from the steering angle sensor 5 and the yaw rate sensor 6 which are connected to the system ECU 3, a travelling direction of the own-vehicle VM (predicts a path along which the own-vehicle VM will advance). The own-vehicle path calculation section 32 corresponds to an example of a vehicle information calculation section.

Although detailed description will be given below, with respect to a target detected by a radar device 1, the target determination section 33 regards the target, for example, as another vehicle, based on characteristics of the movement of the target and characteristics of the movement of the own-vehicle VM, and estimates a capture position on the other vehicle. Further, the target determination section 33 determines, based on the estimated capture position, a risk of collision between the target which has been regarded as the other vehicle and the own-vehicle VM. Then, if the target determination section 33 has determined that there is a high possibility of collision between the own-vehicle VM and the target, the target determination section 33 instructs the safety system 8 to take safety measures described below. The target determination section 33 corresponds to an example of a processing section and a collision determination section defined in claims.

When there is a high risk of collision with the target, the safety system 8 provides the driver of the own-vehicle VM with an alert in accordance with the instruction from the target determination section 33. Further, when a collision with the target cannot be avoided, the safety system 8 reduces damages to a passenger of the own-vehicle VM in accordance with the instruction from the target determination section 33 (for example, passenger protections). Hereinafter, the operations performed by the safety system 8 will be collectively referred to as safety measures.

Here, an example of a device included in the safety system 8 will be described. For example, the safety system 8 includes a display device such as a warning lamp, and an alarm device such as a warning buzzer. When the target determination section 33 has determined that there is a risk of collision between the target and the own-vehicle VM, the target determination section 33 provides the driver of the own-vehicle VM with an alert by means of the display device and the alarm device. Moreover, the safety system 8 includes a risk-avoidance device for assisting the driver of the own-vehicle VM in performing brake operation in order to avoid collision with the target. Moreover, the safety system 8 includes a collision damage reduction device which restrains the passenger of the own-vehicle VM to his/her seat and reduces collision damages by rewiding the seat belt or causing the seat to move when the target determination section 33 has determined that collision with the target cannot be avoided. The collision damage reduction device also causes the air bag to inflate, and moves the seat to a position to be ready for a collision. The above-described devices included in the safety system 8 are only examples and not limited thereto.

Next, with reference to the flow charts, the radar ECU 2 and the system ECU 3 will be described.

First, with reference to FIG. 3, an example of operations performed by the radar ECU 2 of the object recognition device according to the present embodiment will be described.

Figure 3:
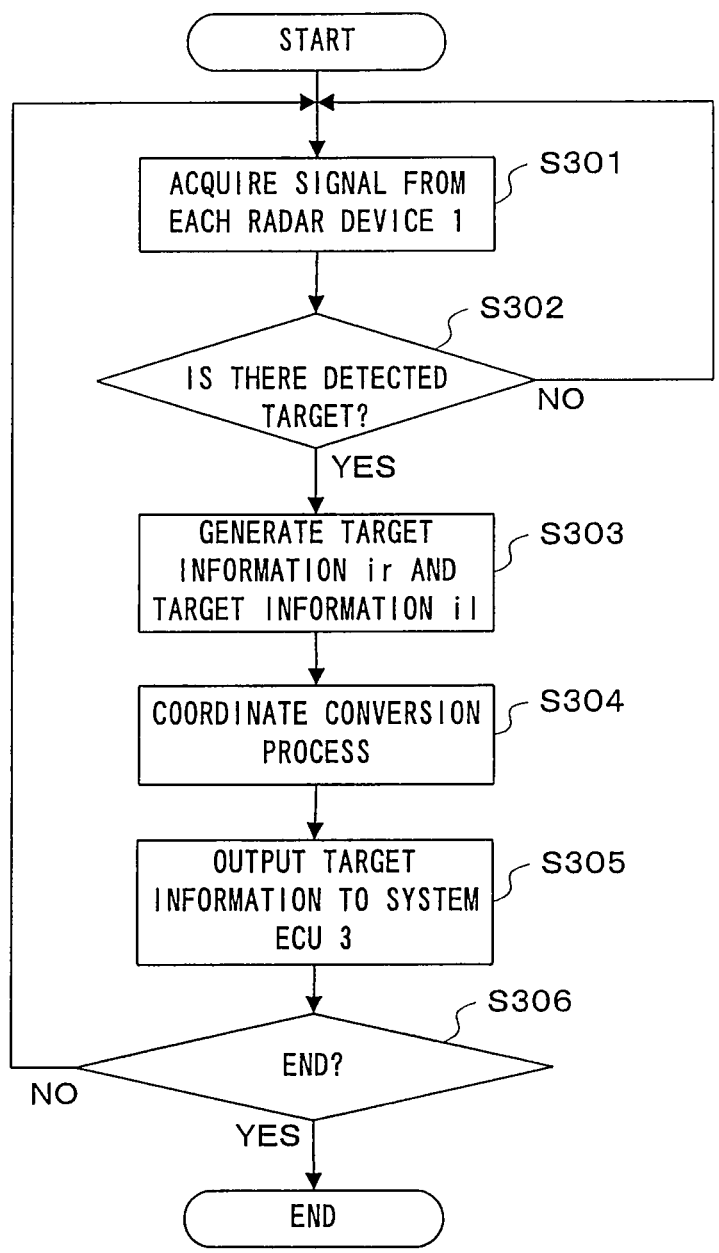
FIG. 3 is a flow chart showing an example of processes performed by a radar ECU 2 of an object recognition device according to an embodiment.

FIG. 3 is a flow chart showing an example of processes performed by the radar ECU 2 of the object recognition device according to the present embodiment. The processes of the flow chart shown in FIG. 3 are performed when the radar ECU 2 executes a predetermined program included in the radar ECU 2. The program for causing the processes shown in FIG. 3 to be performed is stored in advance, for example, in a storage area of the radar ECU 2. When the power supply of the radar ECU 2 is turned ON, (for example, when the driver of the own-vehicle VM has performed an operation for starting a process to cause the processes to be performed, when the ignition switch of the own-vehicle VM is turned ON, or the like), the processes of the flow chart shown in FIG. 3 are performed by the radar ECU 2.

In step S301 in FIG. 3, the radar ECU 2 acquires from each of the radar devices 1 a signal indicating that a target has been detected, and advances the processing to the next step S302. It should be noted that when the right radar device 1R has not detected a target (specifically, when there is no target in a detection range AR of the right radar device 1R), the right radar device 1R outputs to the radar ECU 2 a signal indicating that the number of targets is 0 (there is no target). Similarly, when the left radar device 1L has not detected a target (specifically, when there is no target in a detection range AL of the left radar device 1L), the left radar device 1L outputs to the radar ECU 2 a signal indicating that the number of targets is 0 (there is no target).

In step S302, the radar ECU 2 determines whether there are targets detected by the radar devices 1, respectively. Specifically, the radar ECU 2 determines, based on the signal acquired from the right radar device 1R in step S301, whether the right radar device 1R has detected a target. Similarly, the radar ECU 2 determines, based on the signal acquired from the left radar device 1L in step S301, whether the left radar device 1L has detected a target. Then, when the result of the determination by the radar ECU 2 is affirmative (YES), the processing is advanced to the next step S303. When the result of the determination by the radar ECU 2 is negative (NO), the processing is returned to step S301, and the radar ECU 2 acquires signals again. That is, when at least one of the radar devices 1 has actually detected a target, the radar ECU 2 advances the processing to step S303, and when neither of the right radar device 1R nor the left radar device 1L has detected a target, ECU 2 returns the processing to step S301.

In step S303, the radar ECU 2 generates target information ir for each target by using a signal acquired from the right radar device 1R. Specifically, the radar ECU 2 generates, as target information ir, information containing the distance, speed, position, and the like of the target relative to the right radar device 1R, by using the signal from the right radar device 1R. Similarly, the radar ECU 2 generates target information il for each target, by using a signal acquired from the left radar device 1L. Specifically, the radar ECU 2 generates, as target information il, information containing the distance, speed, position, and the like of the target relative to the left radar device 1L, by using the signal from the left radar device 1L. Then, the radar ECU 2 advances the processing to the next step S304.

In step S304, with respect to all the targets currently stored in the target information storage section 34, the radar ECU 2 performs a process for converting position coordinates by using corresponding target information ir or il. Now, with reference to FIG. 4, using the left radar device 1L as an example, the coordinate conversion process performed by the radar ECU 2 in step S304 will be described.

Figure 4:
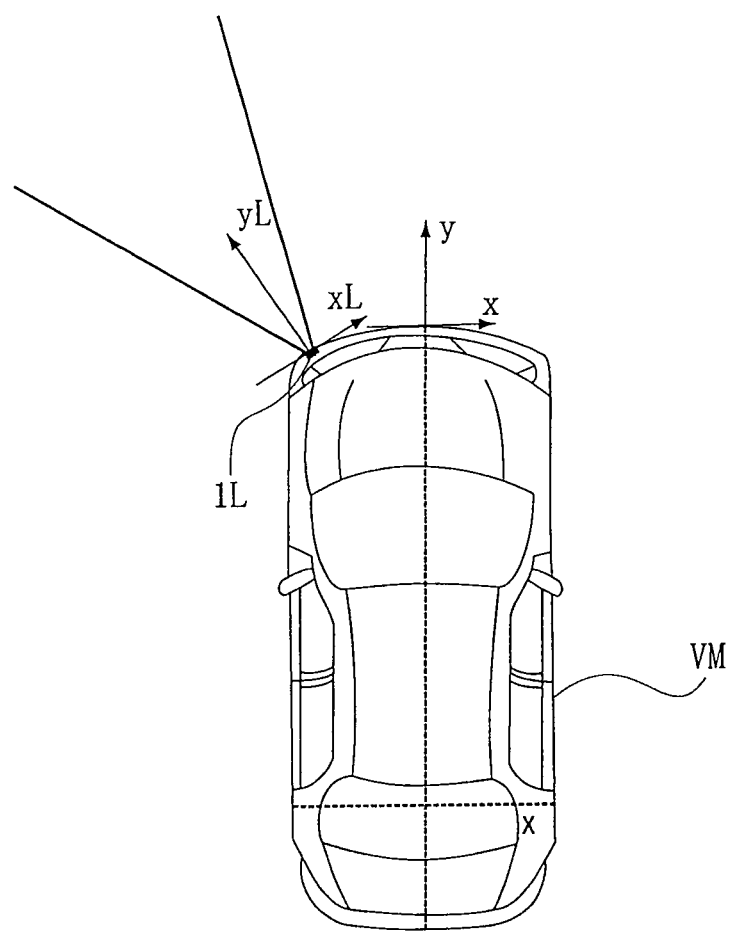
FIG. 4 shows a coordinate system (xL yL) having an origin which is a position at which a left radar device 1L is installed, and a coordinate system (X, Y) having an origin which is the center of the front part of the own-vehicle VM.

FIG. 4 shows a coordinate system (xL, yL) having its origin at the installation position of the left radar device 1L, and a coordinate system (X, Y) having its origin at the center of the front part of the own-vehicle VM. In FIG. 4, position information of a target contained in the target information il is represented by the coordinate system having its origin at the installation position of the left radar device 1L. In other words, the position information contained in the target information il is processed by the radar ECU 2 as a value represented by the coordinate system (xL, yL) having its origin at the installation position of the left radar device 1L. Then, in order to make subsequent processes simple, the radar ECU 2 performs a coordinate conversion process for converting the coordinate system (xL, yL) of the left radar device 1L into the coordinate system (X, Y) having its origin at the center of the front part of the own-vehicle VM. It should be noted that the radar ECU 2 may perform the coordinate conversion process by using the width of the own-vehicle VM, the installation position, the installation angle, and the like of the left radar device 1L on the own-vehicle VM, which are known in advance. Similarly, with respect to target information ir outputted from the right radar device 1R, the radar ECU 2 also performs a coordinate conversion process. Then, the radar ECU 2 advances the processing to step S305, which is a subsequent process of the coordinate conversion process in step S304.

In step S305, the radar ECU 2 outputs the target information iR and the target information iL to the system ECU 3. Then, the processing is advanced to step S306.

In step S306, the radar ECU 2 determines whether to end the processing. For example, the radar ECU 2 ends the processing when the power supply of the radar ECU 2 is turned OFF (for example, when the driver has performed an operation or the like for ending the process for causing the above processes to be performed, or the ignition switch of the own-vehicle VM is turned OFF, or the like). On the other hand, if the radar ECU 2 has determined to continue the processes, the radar ECU 2 returns the processing to step S301 and repeats the processes.

As described above, by repeating the processes of the flow chart shown in FIG. 3, the radar ECU 2 generates the target information iR and the target information iL. Then, the radar ECU 2 outputs the generated target information iR and the target information iL to the system ECU 3.

Next, with reference to FIG. 5 and FIG. 6, an example of operations performed by the system ECU 3 of the object recognition device according to the present embodiment will be described.

Figure 5:
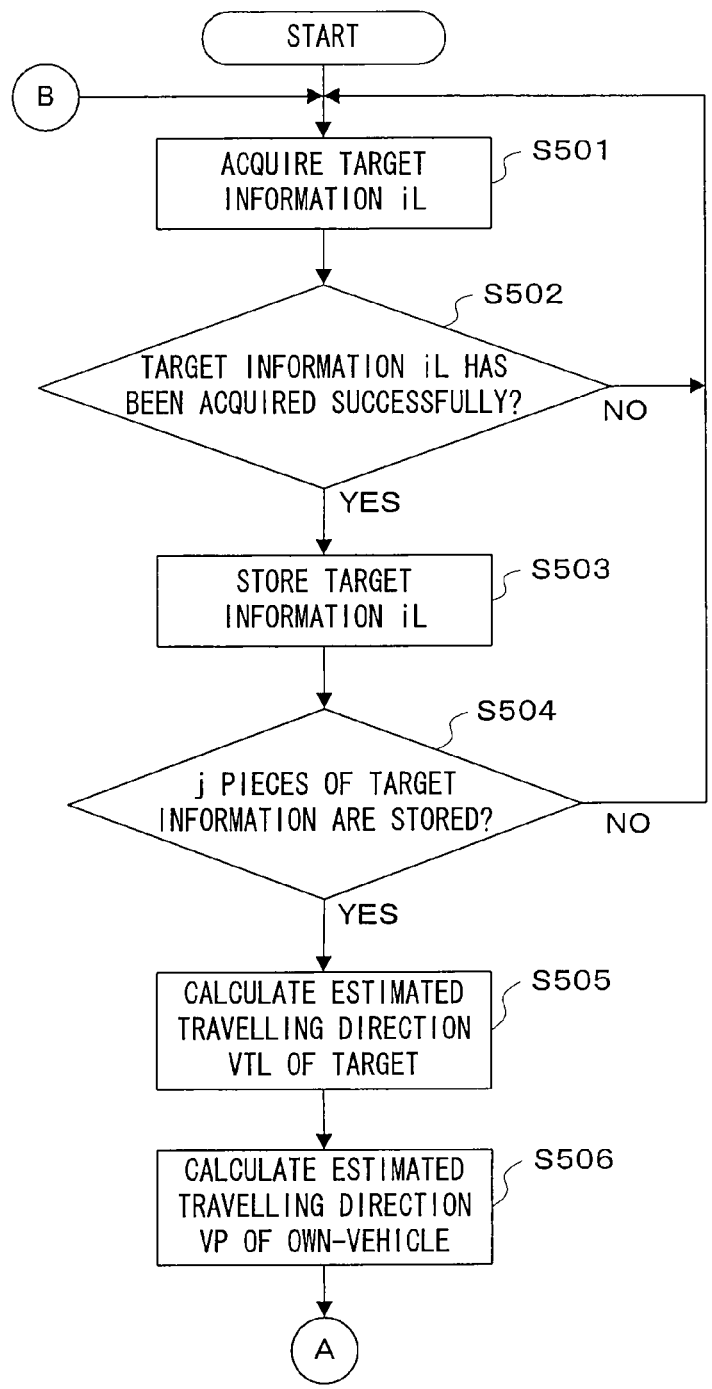
FIG. 5 is a flow chart showing a first half of an example of processes performed at sections in a system ECU 3 of an object recognition device of an embodiment.

Each of FIG. 5 and FIG. 6 is a flow chart showing an example of processes performed by sections in the system ECU 3 of the object recognition device according to the present embodiment. The processes of the flow chart shown in FIG. 5 and FIG. 6 are performed when the sections in the system ECU 3 execute a predetermined program included in the system ECU 3. The program for performing the processes shown in FIG. 5 and FIG. 6 are stored in advance, for example, in a storage area of the system ECU 3. When the power supply of the system ECU 3 is turned ON (for example, the driver of the own-vehicle VM has performed an operation or the like for starting a process for causing the processes to be performed, or the ignition switch of the own-vehicle VM is turned ON, or the like), the processes of the flow charts shown in FIG. 5 and FIG. 6 are performed by the system ECU 3.

In the description below, using the left radar device 1L as an example, an example of processes performed when the target information iL is acquired from the radar ECU 2 will be described on an assumption that the left radar device 1L has detected a target.

In step S501, the target path calculation section 31 acquires target information iL from the radar ECU 2. Then the target path calculation section 31 advances the processing to step S502.

In step S502, the target path calculation section 31 determines whether the target information iL has been acquired. Specifically, the target path calculation section 31 determines whether the target information iL outputted by the radar ECU 2 has been acquired. Then, in a case where the result of the determination by the target path calculation section 31 is affirmative (YES), the processing is advanced to step S503. In a case where the result of the determination is negative (NO), the processing is returned to step S501 and target information iL is acquired again. It should be noted that the case where the result of the determination in the step is negative is a case where the left radar device 1L has not actually detected a target. That is, it is a case where target information iL is not outputted from the radar ECU 2 to the system ECU 3, and the target path calculation section 31 cannot acquire the target information iL. Then, the target path calculation section 31 returns the processing to step S501, and repeats the processes until the target information iL is outputted from the radar ECU 2.

In step S503, the target path calculation section 31 causes the target information storage section 34 to temporarily store pieces of target information iL that have been currently acquired in step S501, in chronological order. Specifically, by the processes of the flow chart shown in FIG. 3 are repeated, pieces of target information iL are sequentially outputted from the radar ECU 2 to the system ECU 3. The pieces of target information iL outputted from the radar ECU 2 are caused to be stored through the process of the step in chronological order into the target information storage section 34 by the target path calculation section 31.

For example, in a case where K pieces of target information iL can be stored per target in the target information storage section 34, target information iL(1), iL(2), iL(3), iL(4), iL(k), iL(K−1), . . . iL(K) are stored in the target information storage section 34 in chronological order, by the processes of the flow chart being repeated. The latest target information at the moment is the target information iL (K). After the target path calculation section 31 has caused the target information storage section 34 to temporarily store the pieces of target information iL in chronological order, the target path calculation section 31 advances the processing to step S504.

In step S504, the target path calculation section 31 determines whether j pieces of target information iL are stored per target in the target information storage section 34. In order to predict the travelling direction of a target, the target path calculation section 31 needs a plurality of pieces of past target information iL of the target, including the latest target information iL (K) at the moment, which will be clear by the description below. Therefore, in the process in step S504, the target path calculation section 31 determines whether at least a predetermined number of pieces (hereinafter referred to as j pieces) of target information iL, including the latest target information iL (K) are stored in the target information storage section 34.

In other words, the target path calculation section 31 determines, in the process in step S504, whether pieces of target information from the latest target information iL (K) to the past target information iL (K−(j−1)) are stored in the target information storage section 34. For example, in a case where j=5, the latest target information iL (K) at the moment, the past target information iL(K−1), iL(K−2), iL(K−3), and iL(K−4), five pieces in total, are necessary.

Then, if the result of the determination by the target path calculation section 31 is affirmative (YES), the target path calculation section 31 advances the processing to step S505. On the other hand, if the result of the determination by the target path calculation section 31 is negative (NO), the target path calculation section 31 returns the processing to step S501. That is, until at least j pieces of target information iL are stored per target in the target information storage section 34, the target path calculation section 31 repeats the processes for acquiring the target information iL.

In step S505, the target path calculation section 31 calculates an estimated travelling direction VTL of a target. Here, with reference to FIG. 7, an example of a process performed by the target path calculation section 31 in this step will be described.

FIG. 7 shows a target detection state stored in the target information storage section 34. In order to make the description simple, description will be given on an assumption that the number of pieces of target information iL necessary for the target path calculation section 31 to predict the travelling direction of a target (corresponds to j pieces in step S504) is five. That is, as shown in FIG. 7, an estimated travelling direction VTL of a target is predicted by using the latest target information iL(K), the past target information iL(K−1), iL(K−2), iL(K−3), and iL(K−4).

Specifically, the target path calculation section 31 uses pieces of target information iL stored in the target information storage section 34, and plots dots indicating positions of each target detected by the left radar device 1L and indicated by pieces of target information of the target, on the coordinate system (X, Y) having its origin at the center of the front part of the own-vehicle VM. Then, the target path calculation section 31 determines the slope of an approximate straight line of the dots by the least-squares method or the like. Further, the target path calculation section 31 determines a straight line that passes the latest target (specifically, the dot indicated by the target information iL (K)) and that has the above slope, and calculates an estimated travelling direction VTL of the target. Then, the target path calculation section 31 advances the processing to step S506. It should be noted that the direction of the vector (the direction of an arrow of the estimated travelling direction VTL) is set in accordance with the direction in which the target advances.

In step S506, the own-vehicle path calculation section 32 calculates an estimated travelling direction VP of the own-vehicle VM. As an example of a specific process, for example, the own-vehicle path calculation section 32 acquires a steering angle and a yaw rate of the own-vehicle VM from the steering angle sensor 5 and the yaw rate sensor 6 that are connected to the system ECU 3, and calculates the estimated travelling direction VP of the own-vehicle VM. Then, the own-vehicle path calculation section 32 advances the processing to step S507.

In step S507, the target determination section 33 calculates a collision angle θL based on the estimated travelling direction VTL of the target and the estimated travelling direction VP of the own-vehicle VM, which have been calculated by the target path calculation section 31 and the own-vehicle path calculation section 32 in the step S505 and step S506, respectively. It should be noted that the collision angle θL denotes an angle between a straight line extended in the direction of arrow of the estimated travelling direction VTL of the target and the travelling direction VP of the own-vehicle VM (see FIG. 8). The collision angle θL is defined as 0° when the estimated travelling direction VTL of the target and the travelling direction VP of the own-vehicle VM are opposite to each other and they extend in parallel to each other. Further, the clockwise direction from the travelling direction VP is defined as corresponding to the positive values of collision angle θL. That is, for example, in a case where the collision angle θL is −45°, if the target is seen from the own-vehicle VM, the target advances toward the own-vehicle VM in a diagonally forward left direction.

Figure 8:
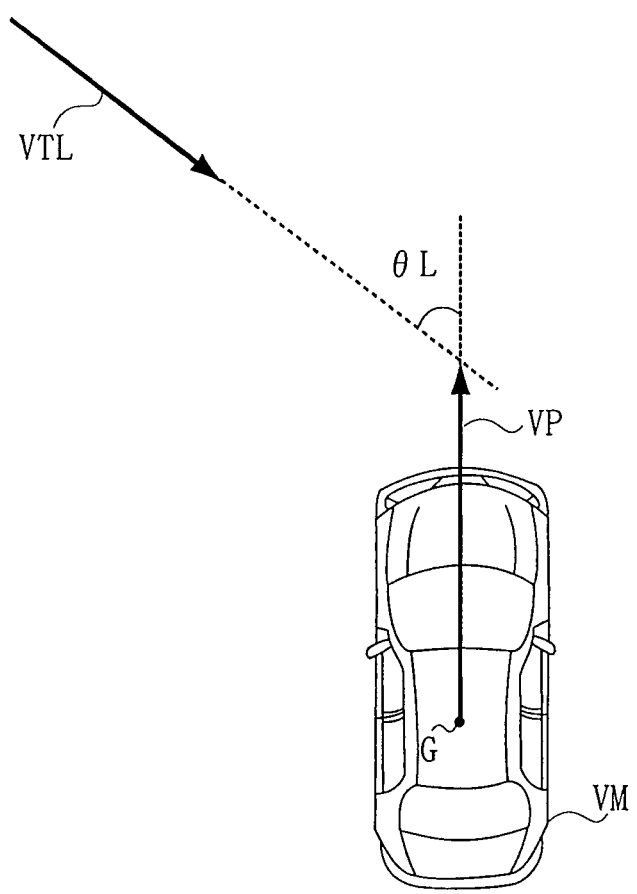
FIG. 8 illustrates a collision angle θL.

It should be noted that the example shown in FIG. 8 represents a case where the own-vehicle VM advances straight. However, it is possible to calculate the collision angle θL even when the own-vehicle VM is turning.

Figure 9:
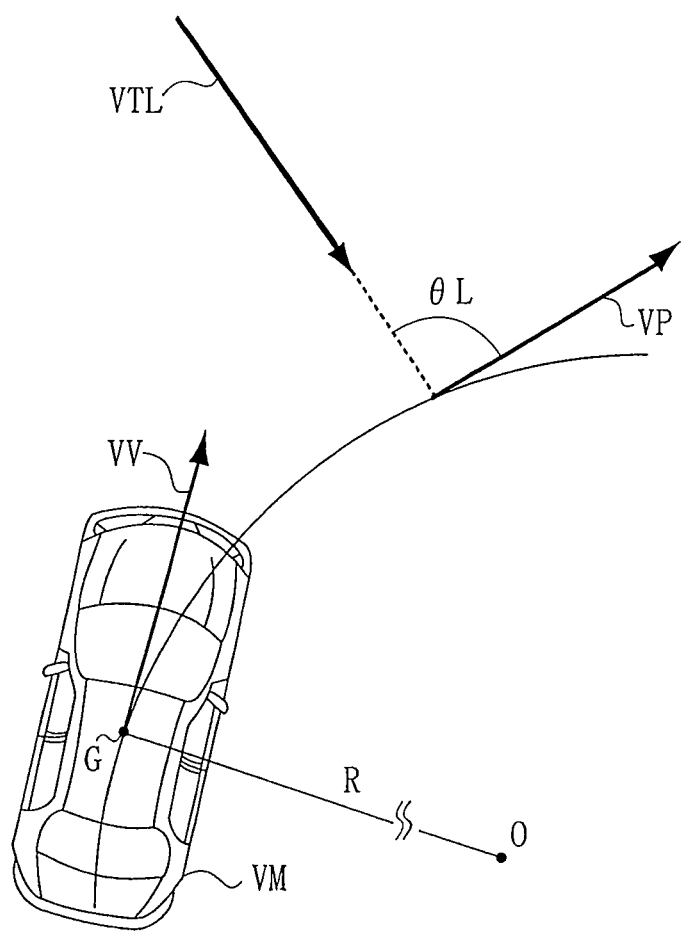
FIG. 9 illustrates a collision angle θL at the time when the own-vehicle VM is in a turning state.

For example, a scene where the own-vehicle VM is turning, specifically, the own-vehicle VM is traveling along a right curve, will be described with reference to FIG. 9. FIG. 9 illustrates an example where the own-vehicle VM is turning rightward. In general, an instantaneous direction of the speed of a vehicle (direction of the vehicle) when the vehicle is turning can be represented, with respect to a turning circle having a radius R which is drawn by the center of gravity G of the own-vehicle VM when the own-vehicle VM is turning, by a tangential direction VV at a position of the turning circle at which the center of gravity G of the own-vehicle VM is currently located. In this case, an intersection of a straight line extended in the direction of the arrow of the estimated travelling direction VTL of the target and the circumference of the turning circle is the point at which the collision between the target and the own-vehicle VM is predicted. That is, the tangential line of the intersection on the circumference is the estimated travelling direction VP of the own-vehicle VM at the intersection. Therefore, the collision angle θL at the moment is, as shown in FIG. 9, an angle between the straight line extended in the direction of the arrow of the estimated travelling direction VTL of the target and the estimated travelling direction VP.

The curve radius R is calculated by the own-vehicle path calculation section 32. However, since the calculation method may be any method generally known to a person having ordinary skill in the art, detailed description thereof will be omitted. For example, the own-vehicle path calculation section 32 acquires information indicating the steering angle and the yaw rate of the own-vehicle VM from the steering angle sensor 5 and the yaw rate sensor 6 that are connected to the system ECU 3, and calculates the curve radius using the information.

In order to make description simple, a case in which the own-vehicle VM is traveling straight (not turning) will be described below.

With reference back to FIG. 6, in step S508 in FIG. 6, the target determination section 33 estimates, based on the collision angle θL calculated in step S507, a capture position of the target. Specifically, the target determination section 33 regards the target as a vehicle having an ordinary size (hereinafter simply referred to as other vehicle), and classifies, based on the collision angle θL, where on the other vehicle is detected as a captured point, in accordance with the criteria below.

(First case) when the collision angle θL is −90°: a right front edge portion of the other vehicle.

(Second case) when the collision angle θL is not −90°: a left front edge portion of the other vehicle.

That is, the target determination section 33 estimates, depending on which of the first case and the second case is satisfied, which portion of the other vehicle has been detected as the captured point. In other words, depending on which of the first case and the second case is satisfied, the target determination section 33 estimates whether the right front edge portion of the other vehicle or the left front edge portion of the other vehicle has been detected as the captured point. An example of the right front edge portion or the left front edge portion of the other vehicle is, for example, a corner portion of the other vehicle.

Figure 10:
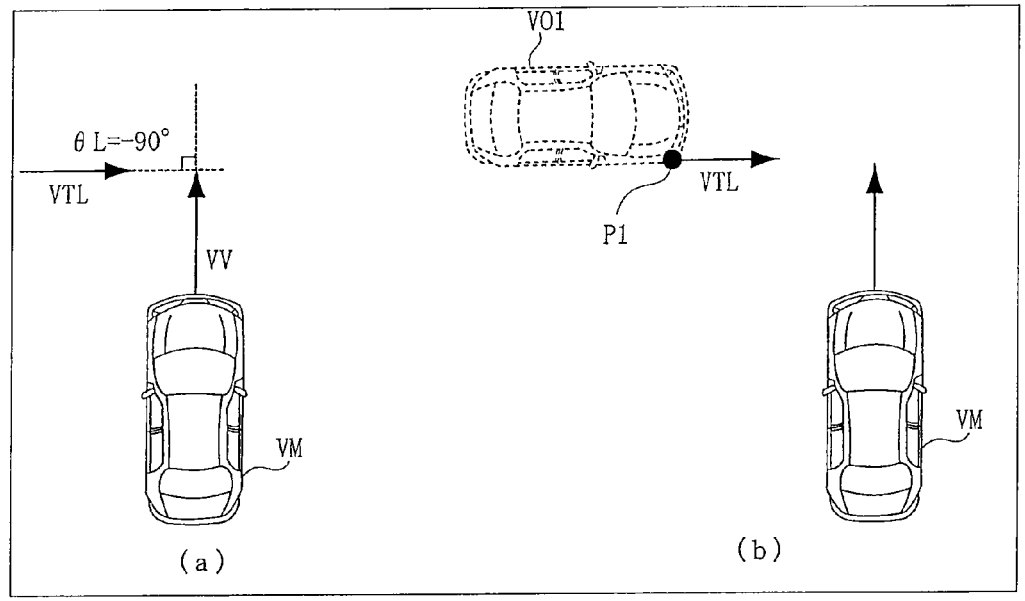
FIG. 10 shows an example of a first case.
Figure 11:
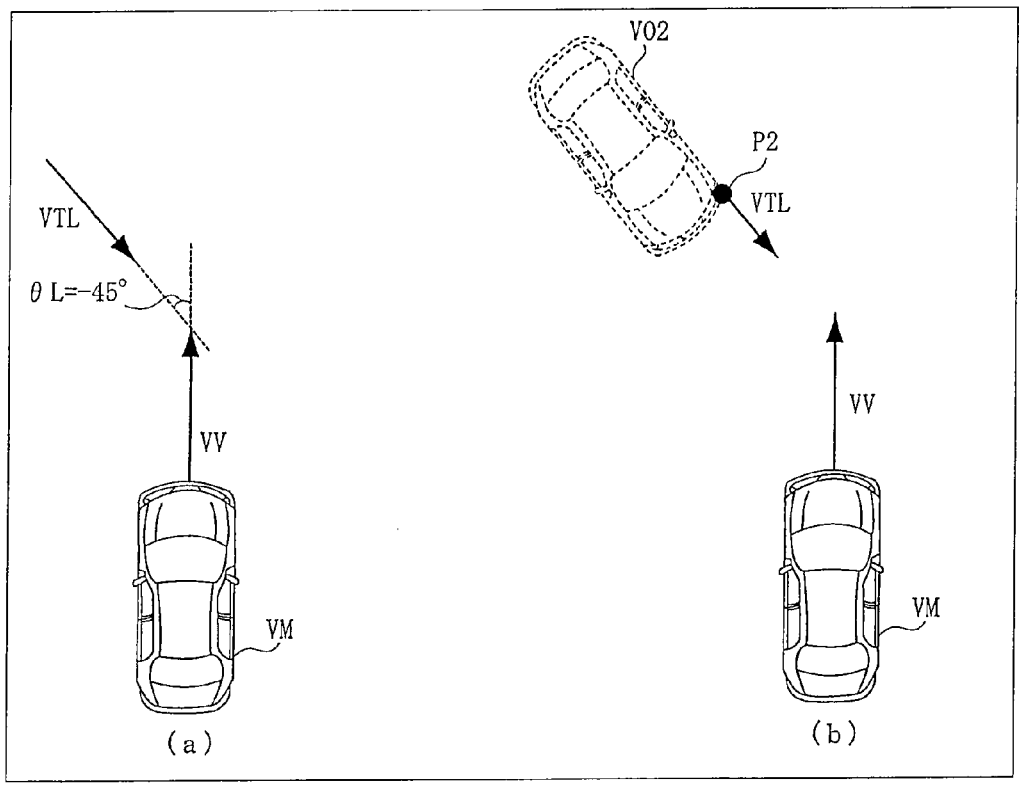
FIG. 11 shows an example of a second case.

Here, with reference to FIG. 10 and FIG. 11, the process performed by the target determination section 33 in step S508 will be described more in detail.

First, an example of the first case will be described with reference to FIG. 10. FIG. 10 shows an exemplary case where the collision angle θL is −90°. As shown in (a) of FIG. 10, when the collision angle θL is −90°, the target detected by the left radar device 1L advances toward the own-vehicle VM directly from the left of the own-vehicle VM, when seen from the own-vehicle VM. In this case, as shown in (b) of FIG. 10, the target determination section 33 regards the target detected by the left radar device 1L as another vehicle VO1, and the target determination section 33 estimates that the left radar device 1L has detected the right front edge portion of the other vehicle VO1 as a captured point P1. That is, when the collision angle θL falls in the first case, the target determination section 33 assumes that the other vehicle VO1 is advancing directly from the left of the own-vehicle VM, and estimates that a point of the other vehicle VO1 nearest to the own-vehicle VM has been detected as the captured point.

Next, an example of the second case will be described with reference to FIG. 11. FIG. 11 shows an exemplary case where the collision angle θL is −45°. As shown in (a) of FIG. 11, when the collision angle θL is −45°, the target detected by the left radar device 1L advances from a diagonally forward left direction toward the own-vehicle VM, when seen from the own-vehicle VM. In this case, as shown in (b) of FIG. 11, the target determination section 33 regards the target detected by the left radar device 1L as another vehicle VO2, and the target determination section 33 estimates that the left radar device 1L has detected the left front edge portion of the other vehicle VO2 as a captured point P2. In other words, when the collision angle θL falls in the second case, the target determination section 33 assumes that the other vehicle VO2 is advancing from the diagonally forward left direction toward the own-vehicle VM, and estimates that a point on the other vehicle VO2 nearest to the own-vehicle VM has been detected as the captured point.

That is, based on the value of the collision angle θL, the target determination section 33 determines, depending on whether the target regarded as the other vehicle advances directly from the left when seen from the own-vehicle VM, whether the first condition or the second condition is satisfied.

It should be noted that the value of the collision angle θL, −90°, based on which the target determination section 33 determines whether the case falls in the first case or the second case, is not limited thereto. In order to allow the target determination section 33 to also determine a case where the target regarded as the other vehicle advances substantially directly from the left when seen from the own-vehicle VM, to be the first case, the collision angle θL may be given, for example, an additional range of ±15° to −90° so that the case may fall in the first case. That is, the collision angle θL may be −105°≤θL≤−75°. Similarly, when the collision angle θL does not satisfy −105°≤θL≤−75°, the target determination section 33 may determine that the case falls in the second case. The additional range, that is, ±15°, is an example, and it is understood the additional range can be changed as appropriate.

With reference back to FIG. 6, in step S509 in FIG. 6, the target determination section 33 estimates the size of the target based on the position of the captured point estimated in the process in step S508. Hereinafter, an example of the process performed by the target determination section 33 in this step will be specifically described with reference to the drawings.

Figure 12:
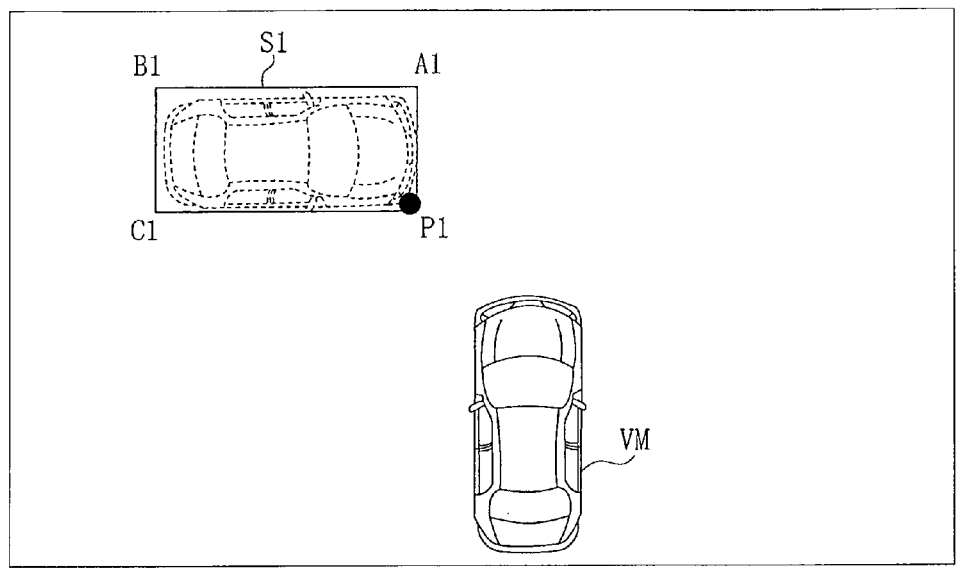
FIG. 12 shows a presence area of a target in the first case.

For example, it is assumed that the target determination section 33 has determined in the process in step S508 that the collision angle θL falls in the first case and has estimated that the left radar device 1L has detected the right front edge portion of the other vehicle VO1 as the captured point P1. In this case, as shown in FIG. 12, for example, the target determination section 33 regards the position of the captured point P1 as the right front edge portion of the other vehicle V01, and estimates that the target detected by the left radar device 1L is an object having a size indicated by an area S1 encompassed by the captured point P1, a point A1, a point B1, and a point C1.

Figure 13:
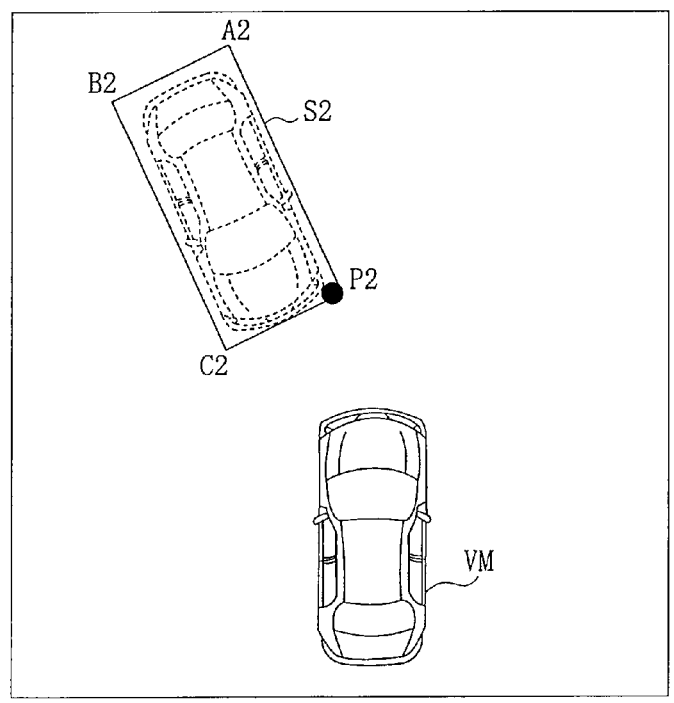
FIG. 13 shows a presence area of a target in the second case.
Figure 14:
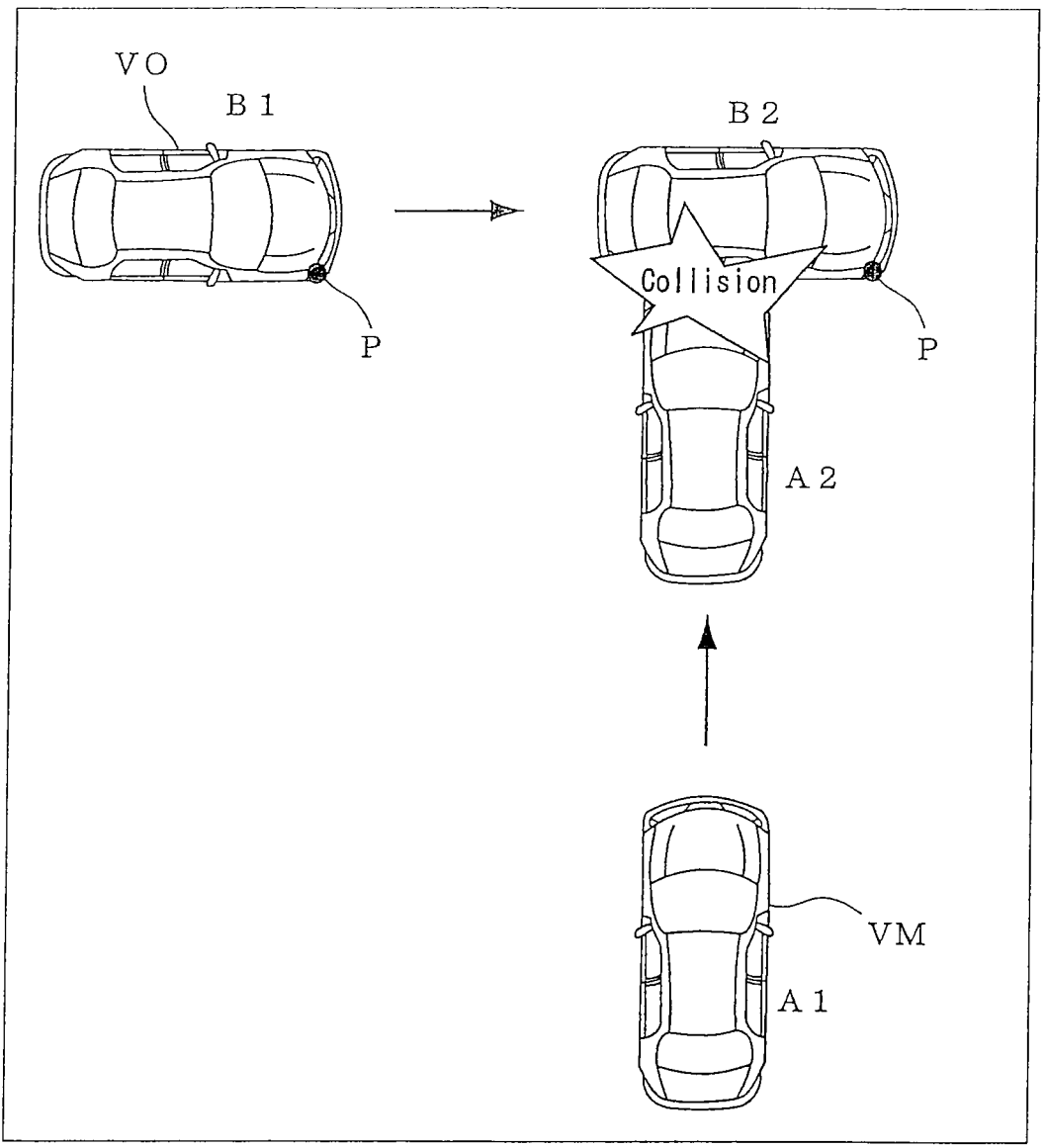
FIG. 14 shows how another vehicle approaches the own-vehicle VM from the forward-left direction.

On the other hand, for example, it is assumed that the target determination section 33 has determined that the collision angle θL falls in the second case in the process in step S508 and has estimated that the left radar device 1L has detected the left front edge portion of the other vehicle VO2 as the captured point P2. In this case, as shown in FIG. 13, for example, the target determination section 33 regards the position of the captured point P2 as the left front edge portion of the other vehicle VO2, and estimates that the target detected by the left radar device 1L is an object having a size indicated by an area S2 encompassed by the captured point P2, a point A2, a point B2, and a point C2. It should be noted that the orientation of the area S1 and the area S2 may be determined based on the collision angle θL.

As described above, by performing the process in step S509, the target determination section 33 estimates the target detected by the left radar device 1L as an object having a certain size as described above, and does not regard the target detected by the left radar device 1L as a point (specifically, the captured point P1 or the captured point P2). That is, in the example shown in FIG. 12, the target determination section 33 estimates that the object having a size indicated by the area S1 encompassed by the captured point P1, the point A1, the point B1, and the point C1 advances toward the own-vehicle VM directly from the left of the own-vehicle VM.

The positions of the point A1, the point B1, and the point C1 which encompass the area S1 along with the captured point P1 may be set with reference to the captured point P1, based on a width and a length of a general automobile. For example, the distance between the captured point P1 and the point A1 may be a width of a general vehicle, and the distance between the point P1 and the point C1 may be a length of a general vehicle. Similarly, the positions of the point A2, the point B2, and the point C2 which encompass the area S2 along with the captured point P2 may also be set with reference to the captured point P2, on an assumption that a general automobile advances from a diagonally forward left direction toward the own-vehicle VM.

Further, in the example described above, each of the area S1 and the area S2 is a frame having a rectangle shape to represent the size of the other vehicle. However, the area representing the size of the target estimated in step S509 is not limited thereto. That is, based on the estimated capture position, the target is regarded not as a point but as a figure having a predetermined size assuming in advance an object to be detected (an object having a certain size), and the area indicating the size may be set. Further, the size of the figure may be changed in accordance with the strength of the electromagnetic waves (magnitude of the radio field intensity).

With reference back to FIG. 6, in step S510 in FIG. 6, the target determination section 33 determines whether there is a possibility of collision between the target and the own-vehicle VM. Specifically, in step S510, the target determination section 33 determines whether there is a possibility of collision between the target having the size (area) estimated in step S509 and the own-vehicle VM.

Then, if the result of the determination is negative (NO), the target determination section 33 advances the processing to step S512. On the other hand, if the result of the determination is affirmative (YES), that is, the target determination section 33 has determined that there is a possibility of collision between the own-vehicle VM and the target and the collision will not be avoided, the target determination section 33 advances the processing to step S511. Then, in step S511, the target determination section 33 instructs the safety system 8 to take safety measures as described above.

In step S510, for example, based on the speed of the target contained in the target information iL, the speed of the own-vehicle VM outputted from the wheel speed sensor 7, the estimated travelling direction VTL of the target calculated in step S505, and the estimated travelling direction VP of the own-vehicle VM calculated in step S506, the target determination section 33 calculates the time period before the own-vehicle VM and the target collide with each other, that is, a time to collision (TTC). Then, the target determination section 33 comprehensively examines the time to collision, the size of the target estimated in step S509, the size of the own-vehicle VM, and the like, and determines whether there is a possibility of collision between the target and the own-vehicle VM. Therefore, since the possibility of collision between the target and the own-vehicle VM is determined, taking into consideration the size of the target and the size of the own-vehicle VM as well, the accuracy of the determination of the possibility of collision is improved, compared with a case where the possibility of collision is determined with the target detected by the right radar device 1R regarded as a point.

In step S512, the target determination section 33 deletes history. Specifically, the target determination section 33 deletes the target information iL (k) stored in the target information storage section 34 sequentially, starting from the oldest piece of the target information iL (k) among the pieces of target information iL stored in the target information storage section 34. Then, the processing is advanced to step S513.

In step S513, the target determination section 33 determines whether to end the processing. For example, when the power supply to the system ECU 3 is turned OFF (for example, the driver has performed an operation or the like for ending the process for causing the processes to be performed, the ignition switch of the own-vehicle VM is turned OFF, or the like), the target determination section 33 ends the processing. On the other hand, when the target determination section 33 has determined to continue the processing, the target determination section 33 returns the processing to step S501 to repeat the processes.

As described above, according to the object recognition device of the present embodiment, it is possible to calculate, based on the estimated travelling direction VP of the own-vehicle VM and the moving direction of the object detected by the radar device 1, the presence area in which the object is present relative to the own-vehicle VM. Therefore, for example, without installing a camera or the like in the vehicle, it is possible to estimate the size of the object detected by the radar device 1 through a simple configuration.

Further, it is possible to determine the possibility of collision between the object and the own-vehicle VM, in consideration of the size of the object (the presence area in which the object is present relative to the own-vehicle VM) as well. Therefore, the accuracy of the determination of the possibility of collision is improved compared with a case where the possibility of collision is determined with the detected object regarded as a point as in a conventional device.

In the example described above, a case has been described where the system ECU 3 performs the processing with respect to the target detected by the left radar device 1L, using the left radar device 1L as an example. However, it is understood that the system ECU 3 can perform the above described operations with respect to not only the target detected by the left radar device 1L but also the target detected by the right radar device 1R.

For example, in a case where the right radar device 1R has detected a target, the target path calculation section 31 acquires target information 1R from the radar ECU 2 with respect to the target detected by the right radar device 1R, and calculates an estimated travelling direction VTR of the detected target. Then, based on the estimated travelling direction VTR of the target detected by the right radar device 1R and the estimated travelling direction VP of the own-vehicle VM, which have been calculated by the target path calculation section 31 and the own-vehicle path calculation section 32, respectively, the target determination section 33 calculates the collision angle θR. As described above, the collision angle is defined as 0° when the estimated travelling direction VTR of the target and the travelling direction VP of the own-vehicle VM are opposite to each other and they extend in parallel to each other. Further, the clockwise direction from the travelling direction VP is defined as corresponding to the positive values. That is, for example, in a case where the collision angle is 45°, if the target is seen from the own-vehicle VM, the target advances toward the own-vehicle VM in a diagonally forward right direction.

Further, the target determination section 33 estimates the capture position of the target based on the calculated collision angle θR. With respect to the target detected by the right radar device 1R, the criteria based on which the capture position of the target is estimated are as follows.

(First case) when the collision angle θR is 90°: a left front edge portion of the other vehicle.

(Second case) when the collision angle θR is not 90°: a right front edge portion of the other vehicle.

That is, when the right radar device 1R has detected a target, the target determination section 33 assumes that the target (other vehicle) is advancing directly from the right or from the right side of the own-vehicle VM, and estimates which portion of the other vehicle has been detected as the captured point.

Then, with respect to the target detected by the right radar device 1R as well, the target determination section 33 estimates, based on the collision angle θR, the size of the target, with reference to the estimated capture position of the target, and determines the possibility of collision between the own-vehicle VM and the target in consideration of the estimated size of the target.

The value of the collision angle θR, 90°, based on which the target determination section 33 determines whether the collision angle θR falls in the first case or the second case, while assuming that the right radar device 1R is used, is not limited thereto. In order to allow the target determination section 33 to also determine a case where the target regarded as the other vehicle advances substantially directly from the right when seen from the own-vehicle VM, to be the first case, the collision angle may be given, for example, an additional range of ±15° to 90° so that the case may fall in the first case. That is, the collision angle θR may be 75°≤θR≤105°. Similarly, when the collision angle θR does not satisfy 75°≤θR≤105°, the target determination section 33 may determine that the case falls in the second case. The additional range, ±15°, is an example, and it is understood that the additional range can be changed as appropriate.

The configurations described in the above described embodiment merely show specific examples, and do not limit the technical scope of the present invention. Any configuration may be applicable within the scope of the effect of the present invention.

INDUSTRIAL APPLICABILITY

The object recognition device and the object recognition method according to the present invention can be used as a radar device to be mounted in a vehicle, which can calculate, with respect to an object detected by a radar, the presence area in which the object is present relative to the own-vehicle, in consideration with the movement of the object and the movement of the own-vehicle.

The invention claimed is:
1. An object recognition device to be mounted on a vehicle, the device comprising:

a radar device which radiates an electromagnetic wave to an object in a forward direction of the vehicle and which detects the object by receiving a reflected wave reflected by the object;

a target information calculation section which calculates information containing a moving direction of the detected object as target information, by using a signal received by the radar device;

a vehicle information calculation section which calculates information containing one of a current moving direction or a future prediction moving direction of the vehicle as vehicle information, by using information obtained from the vehicle; and a processing section which calculates, as a collision angle, an angle between a straight line extended in the moving direction of the object and a straight line extended in the current moving direction or in the future prediction moving direction of the vehicle, which estimates, based on the collision angle from which one of front edge portions in the moving direction of the object detected by the radar device the electromagnetic wave was reflected, and which calculates a presence area in which the object is present relative to the vehicle, in accordance with a result of the estimation, wherein in a case where the collision angle is a right angle or a substantially right angle, the processing section estimates that the electromagnetic wave was reflected from said one of the front edge portions of the object that is on a side facing the vehicle, and in a case where the collision angle is not a right angle or a substantially right angle, the processing section estimates that the electromagnetic wave was reflected from said one of the front edge portions of the object that is nearest to the straight line extended in the current moving direction or in the future prediction moving direction of the vehicle, and wherein the target information calculation section, the vehicle information calculation section, and the processing section are executed by a computer.

2. The object recognition device according to claim 1, further comprising:

a collision determination section which regards the object detected by the radar device as being present in the presence area calculated by the processing section, and which determines a risk of collision between the vehicle and the object, wherein the collision determination section is executed by the computer.

3. The object recognition device according to claim 2, wherein said one of front edge portions is one of front corner edge portions, in the moving direction, of the object.

4. The object recognition device according to claim 1, wherein said one of front edge portions is one of front corner edge portions, in the moving direction, of the object.

5. The object recognition device according to claim 4, wherein the processing section regards the object detected by the radar device as another vehicle, and calculates, as the presence area, an area assuming a shape of the other vehicle, based on the position of the one of the front edge portions from which the electromagnetic wave was reflected.

6. The object recognition device according to claim 1, wherein when the collision angle is an angle falling within a range from the right angle minus 15 degrees to the right angle plus 15 degrees, the processing section estimates that the electromagnetic wave was reflected from said one of the front edge portion of the object that is on the side facing the vehicle.

7. The object recognition device according to claim 6, wherein when the collision angle is an angle falling outside the range from the right angle minus 15 degrees to the right angle plus 15 degrees, the processing section estimates that the electromagnetic wave was reflected from said one of the front edge portion of the object that is nearest to the straight line extended in the current moving direction or in the future prediction moving direction of the vehicle.

8. The object recognition device according to claim 1, wherein when the collision angle is an angle falling outside a range from the right angle minus 15 degrees to the right angle plus 15 degrees, the processing section estimates that the electromagnetic wave was reflected from said one of the front edge portion of the object that is nearest to the straight line extended in the current moving direction or in the future prediction moving direction of the vehicle.

9. An object recognition method using devices to be mounted on a vehicle, the method comprising:

a detection step of radiating, using a radar device, an electromagnetic wave to an object in a forward direction of the vehicle and detecting the object by receiving a reflected wave reflected by the object;

a target information calculation step of calculating information containing a moving direction of the detected object as target information, by using a signal received in the detection step;

a vehicle information calculation step of calculating information containing one of a current moving direction or a future prediction moving direction of the vehicle as vehicle information, by using information obtained from the vehicle; and a processing step of calculating, as a collision angle, an angle between a straight line extended in the moving direction of the object and a straight line extended in the current moving direction or in the future prediction moving direction of the vehicle, estimating, based on the collision angle from which one of front edge portions in the moving direction of the object detected in the detection step the electromagnetic wave was reflected, and calculating a presence area in which the object is present relative to the vehicle, in accordance with a result of the estimation, wherein in a case where the collision angle is a right angle or a substantially right angle, the processing step estimates that the electromagnetic wave was reflected from said one of the front edge portions of the object that is on a side facing the vehicle, and in a case where the collision angle is not a right angle or a substantially right angle, the processing step estimates that the electromagnetic wave was reflected from said one of the front edge portions of the object that is nearest to the straight line extended in the current moving direction or in the future prediction moving direction of the vehicle, and wherein the target information calculation step, the vehicle information calculation step, and the processing step are executed by a computer.

* * * * *